United States Patent
Story, Jr. et al.

(10) Patent No.: US 8,606,775 B2
(45) Date of Patent: *Dec. 10, 2013

(54) GRAPHICALLY REPRESENTING ASSOCIATIONS BETWEEN REFERENTS AND STORIES

(75) Inventors: Guy A. Story, Jr., New York, NY (US); Steven Dzik, Somerset, NJ (US)

(73) Assignee: Audible, Inc., Newark, NJ (US)

(*) Notice: Subject to any disclaimer, the term of this patent is extended or adjusted under 35 U.S.C. 154(b) by 133 days.

This patent is subject to a terminal disclaimer.

(21) Appl. No.: 12/972,058

(22) Filed: Dec. 17, 2010

(65) Prior Publication Data

US 2012/0158706 A1    Jun. 21, 2012

(51) Int. Cl.
*G06F 17/30*     (2006.01)

(52) U.S. Cl.
USPC .......................................................... 707/723

(58) Field of Classification Search
USPC .......................................................... 707/723
See application file for complete search history.

(56) References Cited

U.S. PATENT DOCUMENTS

| | | |
|---|---|---|
| 2002/0198905 A1 | 12/2002 | Tabatabai et al. |
| 2005/0022113 A1 | 1/2005 | Hanlon |
| 2005/0069849 A1 | 3/2005 | McKinney et al. |
| 2008/0021894 A1 | 1/2008 | Styles |
| 2008/0092077 A1* | 4/2008 | Mather et al. ................ 715/781 |
| 2009/0228788 A1* | 9/2009 | Audet ........................... 715/273 |
| 2010/0094879 A1* | 4/2010 | Donnelly et al. ............ 707/749 |
| 2010/0281034 A1 | 11/2010 | Petrou et al. |

* cited by examiner

*Primary Examiner* — Rehana Perveen
*Assistant Examiner* — Alexander Khong
(74) *Attorney, Agent, or Firm* — Knobbe, Martens, Olson & Bear, LLP (57) ABSTRACT

Systems and methods are provided for graphically representing associations between one or more stories and one or more referents of interest. In some embodiments, a score may be determined for each of a set of stories based at least in part on a number of associations between the given story and one or more referents of interest. A graphical representation of the stories may then be presented for display. The graphical representation may include indicia, where each indicium graphically indicates the strength of association between a given story and the one or more referents of interest. The strength of association for a given story may be determined, for example, based at least in part on the determined score for the story.

29 Claims, 8 Drawing Sheets

GRAPHICALLY REPRESENTING ASSOCIATIONS BETWEEN REFERENTS AND STORIES

BACKGROUND

Books, movies, audio books, and other forms of storytelling often include in their narratives a wide range of characters, themes, subject matter, events, etc. A reader, viewer, listener, or other consumer of these narratives may enjoy a particular narrative or story for a variety of reasons, including one or more of the characters, themes, subject matter, and/or events referenced in the narrative. Two or more stories may have references in common. For example, two stories may each be set in the same time period and location, include the same historical person or fictional character, and/or relate to similar subject matter. Typically, a reader, viewer or other consumer who enjoys a particular story is not able to quickly explore or learn of similar stories based on the aspect of the story that they enjoyed, such as a particular character, time period, place or subject.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to graphically representing relationships between one or more stories and one or more referents of interest to a user. For example, aspects of the present disclosure present for display a graphical representation of a number of stories, where an indicium for each story represented includes a color or other indication of the relative strength of association between the story and one or more referents of interest to a user. Other aspects of the present disclosure relate to presenting for display a graphical representation of number of points in a story, where each point in the story includes a color or other indication of the relative strength of association between the point in the story and one or more referents of interest to a user. For example, a point in the story may be associated with a referent if the referent is referenced in or related to the content of the story at the given point. A referent may generally be anything referred to by a story, such as a place, object, real person, fictional character, concept, subject, event, time, and/or visual or mental image.

In some embodiments, a graphical representation as disclosed herein may be considered a "heat map" or "story map" corresponding to a story or set of stories. A color or pattern displayed in a given portion or indicium of the representation may be determined, for example, based on the relative strength of association between one or more referents of interest and the story represented by the given indicium. The story map or other graphical representation may be presented for display such that a user may select an indicium from the representation in order to view additional information related to the story (or point in a story) represented by the given indicium. In this manner, a graphical representation as disclosed herein may enable a user to view a visual summary of the relative strength of association between various stories and one or more referents of interest to the user. The user may then explore stories of interest in more depth. Other graphical representations discussed herein may, for example, enable the user to view a visual summary of the relative strength of association between one or more referents of interest to the user and individual points within a given story.

As used herein, a "story" may generally refer to any narrative, such as a narrative depiction of an act, occurrence and/or course of events, whether or not in chronological order or any other type of sequence. A story may be fictional, nonfictional, or a mixture of both. A story or narrative may be embodied in some medium, such as text, audio, images, and/or or video. A given embodiment of a story may be referred to herein as a "version" of the story. For example, a given story may be embodied in one or more book versions, one or more movie versions, one or more audio book versions, one or more poem versions, etc. These different versions of a particular story may differ in medium and/or in details of the narrative itself. A "story" may also be referred to herein as a "work."

Figure 1:
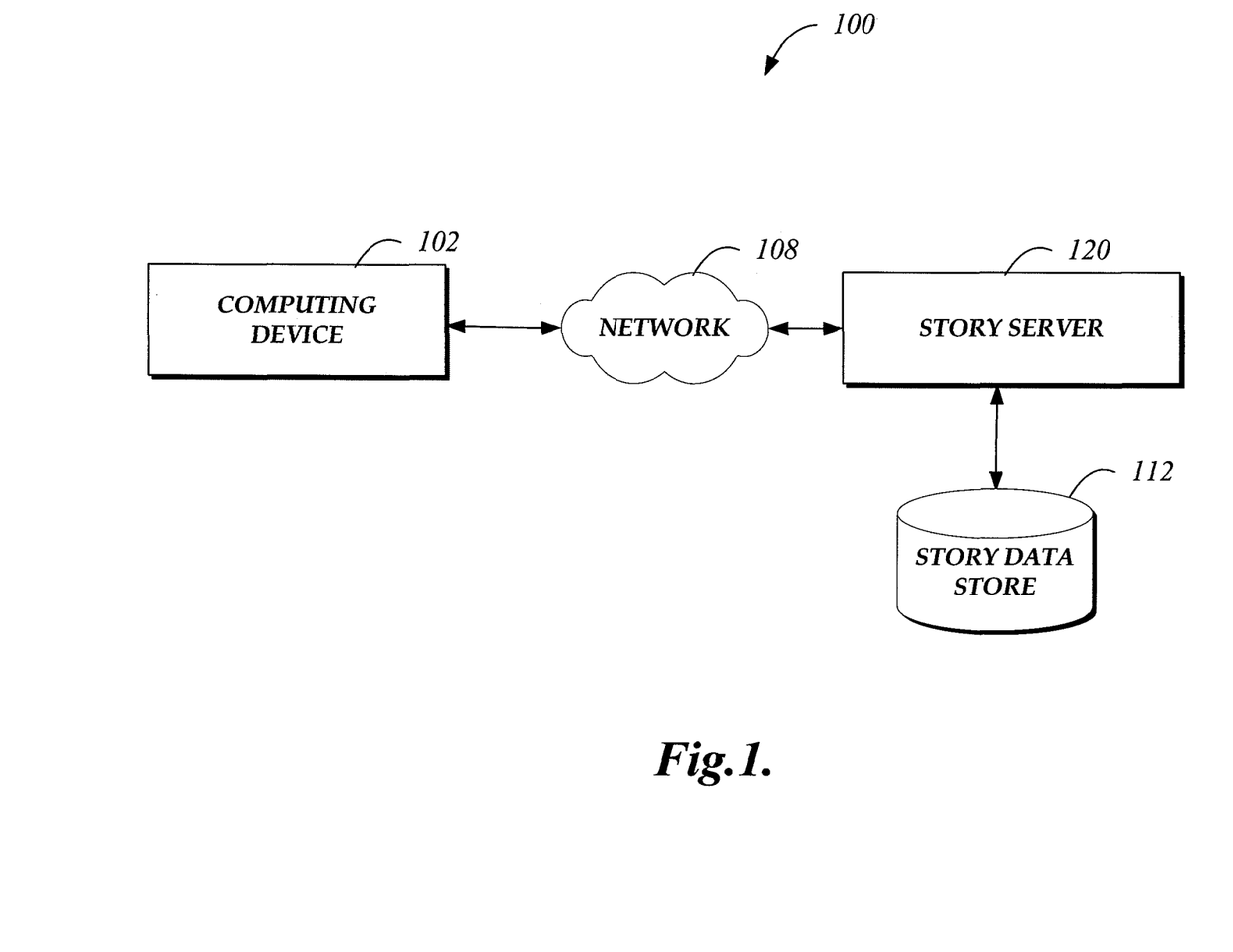
FIG. 1 is a block diagram depicting an illustrative operating environment in which a user of a computing device may view graphical representations of associations between stories and referents.

FIG. 1 depicts an illustrative operating environment in which a user of a computing device may view graphical representations of associations between stories and referents. The depicted environment includes a computing device 102 and a story server 120 communicatively connected by a network 108, such as the Internet. Those skilled in the art will recognize that the computing device 102 may be any of a number of computing devices that are capable of communicating over a network including, but not limited to, a laptop, personal computer, tablet, personal digital assistant (PDA), hybrid PDA/mobile phone, mobile phone, electronic book reader, digital media player, and the like. In some embodiments, the story server 120 may provide front-end communication with various user devices, such as computing device 102, via network 108. The front-end communication provided by the story server 120 may include generating text and/or graphics, possibly organized as a user interface using hypertext transfer or other protocols in response to information inquiries received from the various user devices.

The story server 120, which will be described below in more detail, may be connected to or in communication with a story data store 112. Those skilled in the art will appreciate that the story data store 112 may be local to the story server 120, may be remote to the story server 120, and/or may be a network-based service itself. Those skilled in the art will appreciate that the network 108 may be any wired network, wireless network or combination thereof. In addition, the network 108 may be a personal area network, local area network, wide area network, cable network, satellite network, cellular telephone network, etc., or combination thereof. Protocols and components for communicating via the Internet or any of the other aforementioned types of communication networks are well known to those skilled in the art of computer communications and, thus, need not be described in more detail herein.

The system 100 is depicted in FIG. 1 as operating in a distributed computer environment comprising several computer systems that are interconnected using one or more computer networks. The system 100 could also operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components (including but not limited to virtual utility computing services, a.k.a. "cloud computing services") and peer-to-peer network configurations to implement at least a portion of the processes.

Though not illustrated in FIG. 1, in some embodiments, the environment may also include a retail server that facilitates electronic browsing and purchasing of goods and services using various user devices, such as computing device 102. For example, a retail server may obtain information on available goods and services (or "items") from one or more data stores (not illustrated), as is done in conventional electronic commerce systems. Items may include, for example, versions of stories that are available for purchase, such as books, audio books, movies, etc. In other embodiments, the story server 120 may access item data from the story data store 112 and/or other data sources, either internal or external to system 100.

Figure 2:
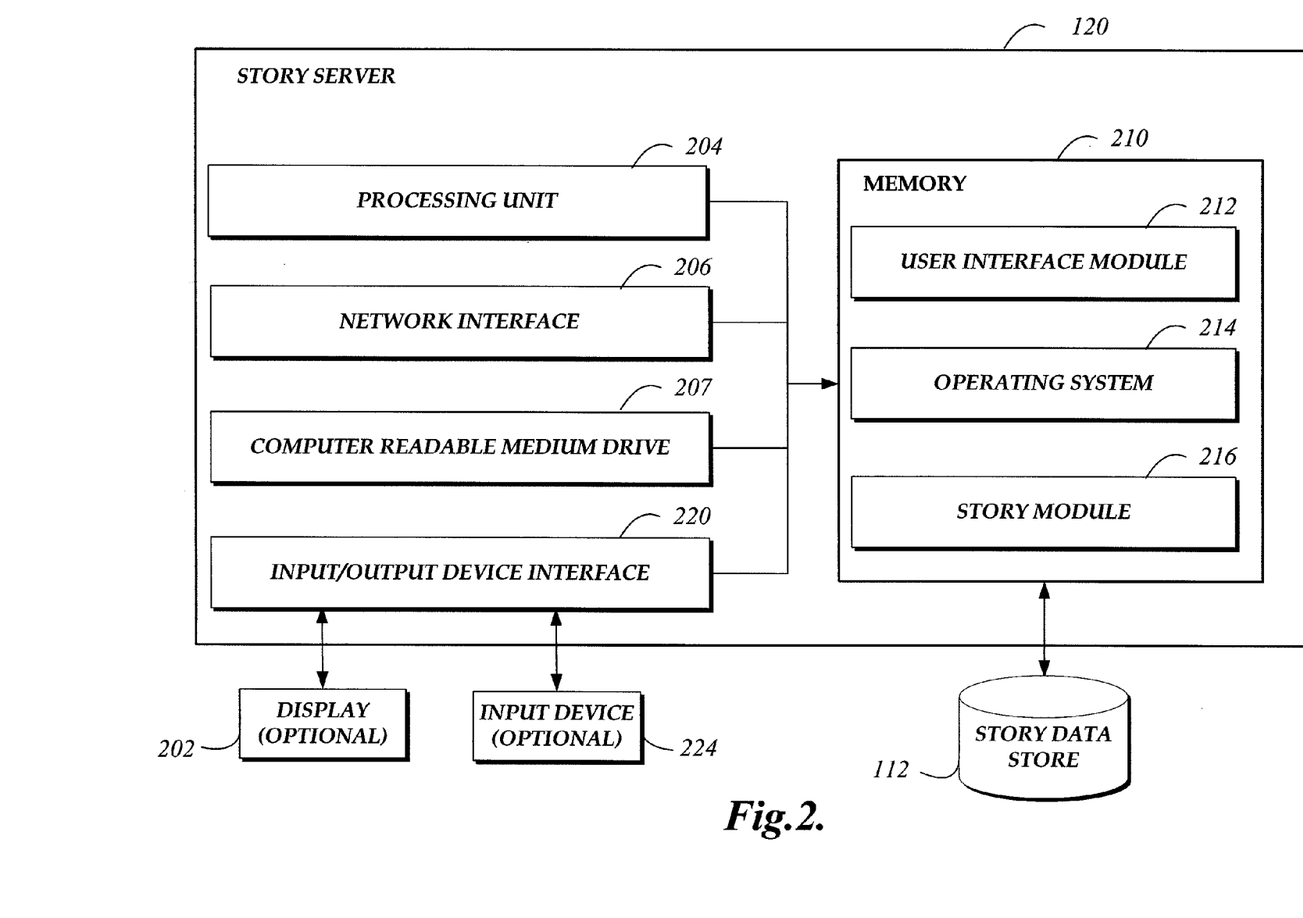
FIG. 2 depicts a general architecture of a story server for causing display of graphical representations of associations between stories and referents.

FIG. 2 depicts a general architecture of a story server 120 for causing display of graphical representations of associations between stories and referents. The general architecture of the story server 120 depicted in FIG. 2 includes an arrangement of computer hardware and software components that may be used to implement aspects of the present disclosure. Those skilled in the art will appreciate that the story server 120 may include many more (or fewer) components than those shown in FIG. 2. It is not necessary, however, that all of these generally conventional components be shown in order to provide an enabling disclosure. As illustrated in FIG. 2, the story server 120 includes a network interface 206, a processing unit 204, an input/output device interface 220, an optional display 202, an optional input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from an optional input device 224, such as a keyboard, mouse, digital pen, touchscreen, etc.

The memory 210 contains computer program instructions that the processing unit 204 executes in order to implement one or more embodiments. The memory 210 generally includes RAM, ROM and/or other persistent, non-transient memory. The memory 210 may store an operating system 214 that provides computer program instructions for use by the processing unit 204 in the general administration and operation of the story server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. In addition, memory 210 may include or communicate with an auxiliary story data store 112. Data stored in the story data store 112 may include information associated with stories and their various versions (such as title, publisher, year of publication, etc.); story content (such as text of a book, audio of an audio book, a digital copy of a movie, etc.); and/or referents associated with stories.

In addition to the user interface module 212, the memory 210 may include a story module 216 that may be executed by the processing unit 204. In one embodiment, the story module 216 implements various aspects of the present disclosure, e.g., determining a score for a story based on a number of associations between the story and one or more referents of interest to a user, determining graphical indicia to represent relationships between stories and referents, etc., as described further below. While the story module 216 is shown in FIG. 2 as part of the story server 120, in other embodiments, all or a portion of a story module may be a part of a user's computing device, such as computing device 102. For example, in certain embodiments of the present disclosure, computing device 102 may include several components that operate similarly to the components illustrated as part of the story server 120, including a user interface module, story module, processing unit, computer readable medium drive, etc. In such embodiments, the computing device 102 may communicate with a story data store, such as story data store 112.

Figure 3:
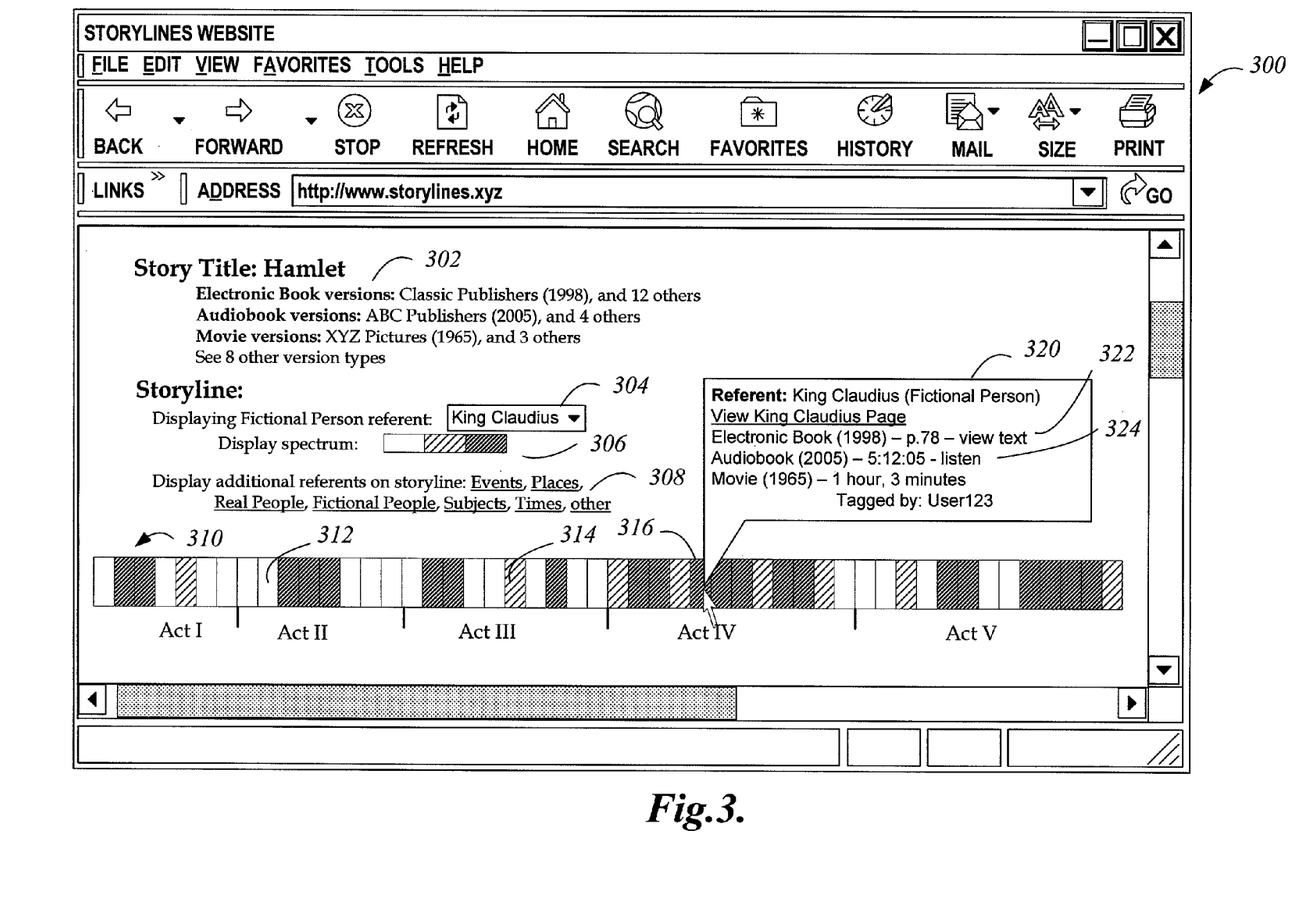
FIG. 3 is an illustrative user interface generated by the story server that displays a graphical representation of a storyline with indicia representing the strength of association between points in the storyline and a referent of interest.

FIG. 3 is an illustrative user interface 300 generated by the story server 120 that displays a graphical representation of a storyline 310 with indicia representing the strength of association between points in the storyline and a referent of interest 304. The user interface 300 includes information 320 associated with a referent referenced by the story at point 316 of the graphical representation of the storyline 310. As shown, the user interface 300 is displayed via a browser operating upon a computing device, such as computing device 102, utilized by a user. As illustrated, user interface 300 includes story version information 302 for the "Hamlet" story. Story version information 302 includes an electronic book version by Classic Publishers, an audio book version by ABC Publishers, and a movie version by XYZ Pictures. Story version information 302 additionally includes a listing of the number of other versions available, including twelve other electronic book versions, four other audio book versions, three other movie versions, and eight versions of other types. A user may select the listing of versions available in order to be presented with one or more additional user interfaces that include identification information for the additional versions not displayed in user interface 300.

User interface 300 includes a referent of interest option 304, indicating that the user has selected the "King Claudius" referent, which is of the referent type "Fictional Person." As discussed above, referents may be of a variety of types, such as a place, object, real person, fictional character, concept, subject, event, time period, etc. The user may have selected the "King Claudius" referent, for example, because the user is interested in the King Claudius character and would like to view a graphical representation of where and/or how often the character is referenced in or otherwise associated with the Hamlet story. As shown in display key or display spectrum 306, the display spectrum for storyline representation 310 in FIG. 3 consists of three potential states: white, a first pattern and a second pattern. The three potential states are shown as patterns for illustrative purposes only, and may represent colors, according to some embodiments. For example, the three potential states may be (from left to right) white, light blue, and dark blue. Alternatively, the display spectrum shown in display key 306 may be a color gradient that includes a continuous spectrum from one color to a second color (such as from white to blue), such that a large number of distinct colors or intensities of a color may be displayed. As used herein, a relative intensity of a color may broadly refer to, for example, a brightness, saturation, shade, and/or amount of the given color, depending on the embodiment. As discussed below, a relative strength of association between a point in the story and a given referent is graphically displayed in storyline graphical representation 310 by an indicium (e.g., indicium 312) that includes a color or pattern from the given display spectrum 306. A lower strength of association is represented by a color or pattern shown further to the left in the display spectrum 306, and a higher strength of association is represented by a color or pattern shown further to the right in display spectrum 306.

Illustrative user interface 300 also includes additional referent options 308, from which the user may select one or more additional referents to be graphically represented in storyline representation 310, as will be discussed below in reference to FIG. 4. It will be appreciated that a wide variety of referent types may be presented other than those listed in referent options 308 (which include events, places, real people, fictional people, subjects, and times). For example, one or more style referent types may be included that refer to a style of the content of a story. A style, in some embodiments, may be determined based on the use of archaic language, the use of profanity, and/or the presence of other indicators of a given style. Some referent types may be specific to a format of a given version of a story. For example, a referent type of "cinematic style" may be relevant to a movie version of story, but not relevant to a book version of a story. In some embodiments, a storyline representation, such as storyline representation 310, may correspond to a single version of a story, while in other embodiments it may correspond to multiple versions, including versions in different formats.

A graphical representation of a storyline, such as graphical storyline representation 310, may generally be considered to graphically represent a story or version of a story as a set of points in narrative order, where each point may be displayed with a corresponding indicium. The narrative order of a point relative to another point may be based on the order that the two points appear in the narrative, which may or may not correspond to the chronological order of events described at the given points in the narrative. For example, a given story may describe an action of an adult character at a first point in the narrative, and then in a later point in the narrative describe a formative event of that character's childhood. In that case, a storyline representation may include an indicium for the first point prior to an indicium for the second point (which is the order in which the points appear in the narrative), rather than in the chronological order that the events occurred in the character's life. In some embodiments, an alternative or additional representation of a story or version of a story may represent points of the narrative in chronological order (not illustrated in FIG. 3). The "point" corresponding to a given indicium may be defined at different levels of particularity, such as by word, paragraph, page, sentence, line, paragraph, coordinates, act, scene, beat, chapter, frame, time, etc., and may depend on the format of the underlying work. In some embodiments, a user may specify a level of particularity (for example, word level, paragraph level, chapter level, etc.) to be represented by each indicium. In some embodiments, the user may be able to adjust the level of particularity in order to display more of less detail, or to "zoom" in or out on a specific portion of the storyline representation (not illustrated in FIG. 3).

Storyline graphical representation 310 includes a number of indicia, such as indicia 312, 314 and 316, each of which may correspond to a point in the Hamlet story. Each indicium, such as indicia 312, 314 and 316, includes a color or pattern representing the relative strength of association between the "King Claudius" referent and the point in the story corresponding to the given indicium. As discussed below, the relative strength of association between the point in the story and the King Claudius referent may be determined by the story server 120 based in part on referent data stored in story data store 112. The referent data stored in story data store 112 may include associations between referents and stories (or points in stories). The referent associations stored in story data store 112 may have been determined in a variety of ways, such as by the systems and methods disclosed in related co-owned and co-pending U.S. patent application Ser. No. 12/881,021, entitled "SYSTEMS AND METHODS FOR ASSOCIATING STORIES WITH RELATED REFERENTS," filed Sep. 13, 2010, which is incorporated herein by reference in its entirety.

As shown in storyline representation 310, indicium 312 is colored white (or the color corresponding to the far left of the display spectrum 306), which may represent that the Hamlet story does not reference the King Claudius referent at the corresponding point in the story. For example, indicium 312 may correspond to a point in the Hamlet story at which the King Claudius character is not present in the scene and in which the King Claudius character is not mentioned. Indicium 314 includes a color corresponding to the middle of the display spectrum 306 (which may be, for example, a light blue). Indicium 314 may correspond to a point in the Hamlet story, for example, at which the King Claudius character is briefly discussed or mentioned but is not present in the scene. Lastly, indicium 316 includes a color corresponding to the far right of the display spectrum 306 (which may be, for example, a dark blue). Indicium 316 may correspond to a point in the Hamlet story, for example, at which the King Claudius character is speaking, or is otherwise a focus of the story content.

The story server 120 may generally determine the color, pattern, or other graphical indication for each indicium, such as indicia 312, 314 and 316, based on the relative strength of association between the point in the story represented by the indicium and the referent of interest to the user (in this case, the King Claudius referent). In some embodiments, the strength of association may be retrieved from story data store 112. For example, the strength of association between a point and a given referent may have been stored in story data store 112 as a result of a user indicating the association and its strength, or as a result of an automated analysis of the text or other content of a version of the story. In other embodiments, the story server 120 may determine the strength of association between the point in the story and the referent of interest by determining a score for the point in the story.

The score for a given point in the story may be determined, in some embodiments, based on the number of associations that the given point in the story has with the referent of interest to the user. For example, if a "point" in storyline 310 corresponds to a page of content of an electronic book version of the story, the story server 120 may determine the score for that point by determining the number of times that the King Claudius character is referenced by or otherwise associated with the content of that page. In some embodiments, the story server 120 may determine a score for each point in the story, and then optionally normalize the scores, such that the color or pattern in the far right of the display spectrum 306 will correspond to the highest score determined by the story server 120. For example, in embodiments in which a score is calculated for each point in the story, the color of indicium 312 may have been selected by the story server 120 as a result of the story server determining a relatively low score or a zero score for the point corresponding to indicium 312. The color of indicium 316 may have been selected by the story server 120 as a result of the story server determining a relatively high score for the point corresponding to indicium 316.

Each of the points or indicia shown in storyline representation 310 may be associated with referent information, similar to referent information 320 that is associated with the point corresponding to indicia 316. Referent information 320 corresponds to fictional person referent "King Claudius," and includes selectable text "View 'King Claudius' page" that may be selected by the user in order to view a user interface that includes additional information regarding the King Claudius referent. Referent information 320 additionally includes a listing of points in specific versions of Hamlet for which the "King Claudius" referent has been associated or "tagged" by a user identified by user name "User123." As illustrated in user interface 300, the user may select "view text" option 322 in order to view a portion of electronic book content, such as text and/or image data, corresponding to the point in the story at indicia 316. For example, selection of the "view text" option 322 may result in the story server 120 generating for display one or more user interfaces that include a portion of book content retrieved from story data store 112 that includes an implicit or explicit reference to a character named "King Claudius." Similarly, selection of "listen" option 324 may enable a user to listen to a portion of a narrated audio recording of the Hamlet story that references a character named "King Claudius," which may be retrieved from story data store 112 or another data store.

In some embodiments, a user may select an indicium at a given point in the storyline 310 in order to view referent information regarding a variety of referents associated with the given point, even if only a subset of the referents were initially selected by the user to be graphically represented in the storyline representation 310. For example, even though indicium 312 indicates that the King Claudius referent is not associated with the corresponding point in the story, a user may select indicium 312 to view information regarding other referents that are associated with the corresponding point in the story.

Figure 4:
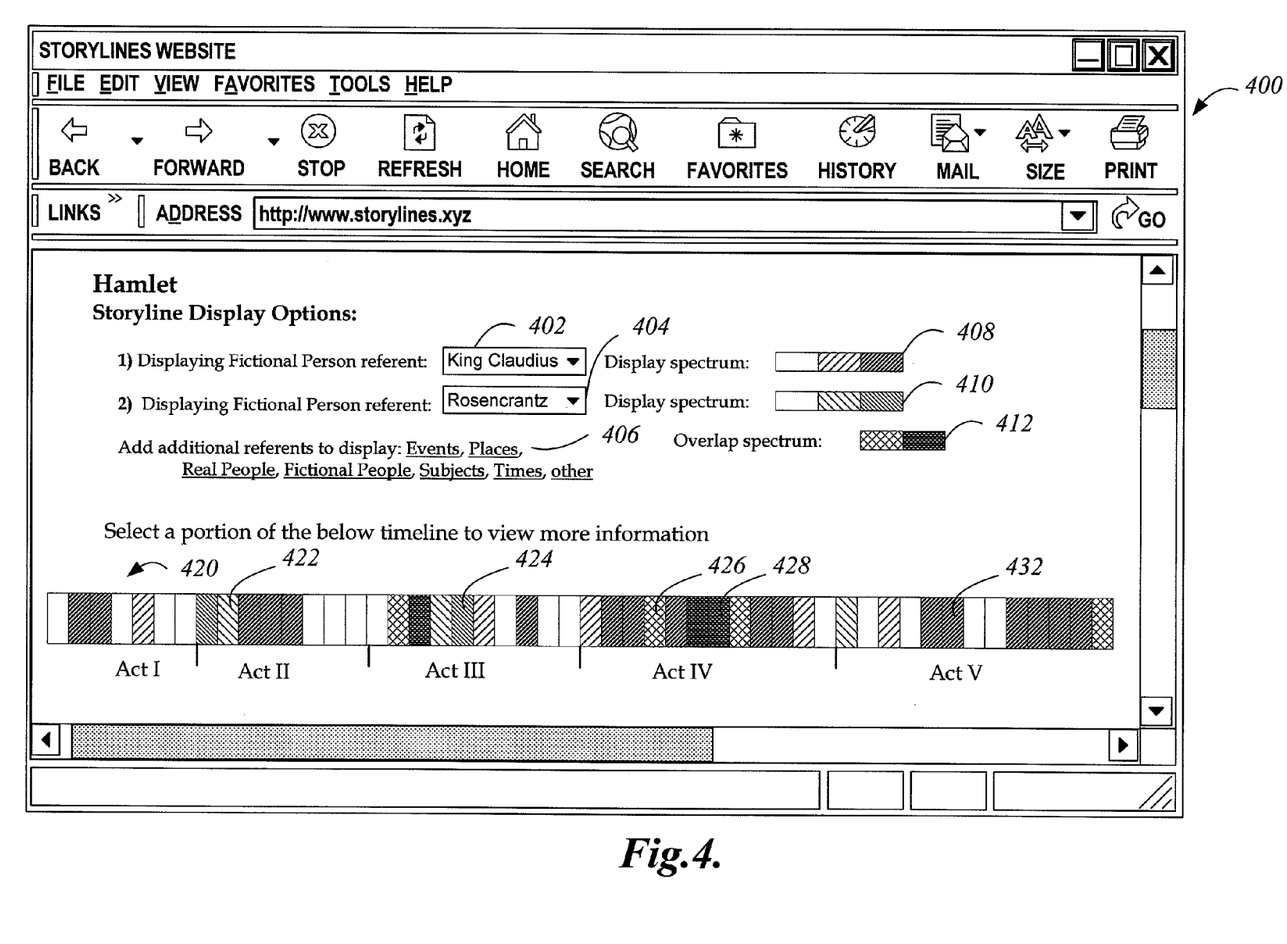
FIG. 4 is an illustrative user interface generated by the story server that displays a graphical representation of a storyline with indicia representing the strength of association between points in the storyline and two referents of interest.

FIG. 4 is an illustrative user interface 400 generated by the story server 120 that displays a graphical representation of a storyline 420 with indicia representing the strength of association between points in the storyline and two referents of interest, referents 402 and 404. User interface 400 may be presented to a user, for example, after the user has selected to add an additional referent to the graphical representation 310 displayed in user interface 300 of FIG. 3, such as by selecting the "Fictional Person" additional referent option included in options 308 of user interface 300. As illustrated in user interface 400, the user has selected a second referent of interest in addition to the previously selected King Claudius referent. The second referent of interest, "Rosencrantz," is also of the "fictional person" referent type. The user may select an additional (third) referent of interest by selecting referent options 406.

As shown in user interface 400, display spectrum 408, corresponding to the King Claudius referent, is the same color as display spectrum 306 discussed above in reference to FIG. 3. Accordingly, the display spectrum 408 may be considered, for example, to be a spectrum from white to dark blue, such that the spectrum increases in intensity of blue from left to right. The display spectrum 410, corresponding to the Rosencrantz referent, may be considered, for example, to be a spectrum from white to dark red, such that the spectrum increases in intensity of red from left to right. Overlap spectrum 412 represents colors or patterns that indicate an association of an indicium with both the King Claudius referent 402 and the Rosencrantz referent 404. For example, the overlap spectrum may contain varying intensity of purple (a color combination of blue, which corresponds to the King Claudius referent, and red, which corresponds to the Roseancrantz referent), such that the overlap spectrum 412 increases in intensity of purple from left to right. As will be appreciated, a different color, pattern or other graphical indication could alternatively be used instead of display spectrum 408, display spectrum 410, and/or overlap spectrum 412.

Storyline representation 420 includes a number of indicia, some of which include the same color or pattern as previously displayed at the corresponding point in storyline 310 of FIG. 3, discussed above. For example, indicium 432 is represented as a dark blue color corresponding to the far right of display spectrum 408, which may indicate that the corresponding point in the Hamlet story has a relatively strong association with the King Claudius referent 402, but is not associated with the Rosencrantz referent 404 (because no red is included in indicium 432). Indicium 424, by contrast, is represented as a dark red color corresponding to the far right of display spectrum 410, which may indicate that the corresponding point in the Hamlet story has a relatively strong association with the Rosencrantz referent, but is not associated with the King Claudius referent. Indicium 422, which is represented as a color in the middle of the display spectrum 410, may indicate that the corresponding point in the Hamlet story has some association with the Rosencrantz referent, but no association with the King Claudius referent.

Indicia in storyline representation 420 that correspond to points associated with both the King Claudius referent 402 and the Rosencrantz referent 404 include a color from overlap spectrum 412 (or some intensity of purple). For example, indicium 426, which is represented as a color to the left of display spectrum 412 (or a light purple), may indicate that the corresponding point in the Hamlet story has some association with both the King Claudius referent and the Rosencrantz referent. Indicium 428, which is represented as a color to the right of display spectrum 412 (a dark purple), may indicate that the corresponding point in the Hamlet story has a strong association with both the King Claudius referent and the Rosencrantz referent.

In some embodiments, rather than an overlap spectrum, such as overlap spectrum 412, each indicium corresponding to a point that is associated with more than one referent may include a combination of the colors that are associated with each referent. For example, if the story server 120 determines a relatively low score for the King Claudius referent 402 at a given point, and a relatively high score for the Rosencrantz referent 404 at the same point, the indicium at that point may be represented by a color combination consisting of a relatively low intensity of blue (corresponding to the King Claudius referent) and a relatively high intensity of red (corresponding to the Rosencrantz referent). In other embodiments, the color of an indicium representing a combination of two or more referents may be selected from an overlap spectrum, such as overlap spectrum 412, based on a single combined score for the two or more referents. In some embodiments, the story server may consider proximity criteria when determining a combined score. For example, the story server may consider the number of words, pages, lines or other content portion that separates the association of the first referent and the association of the second referent.

Figure 5:
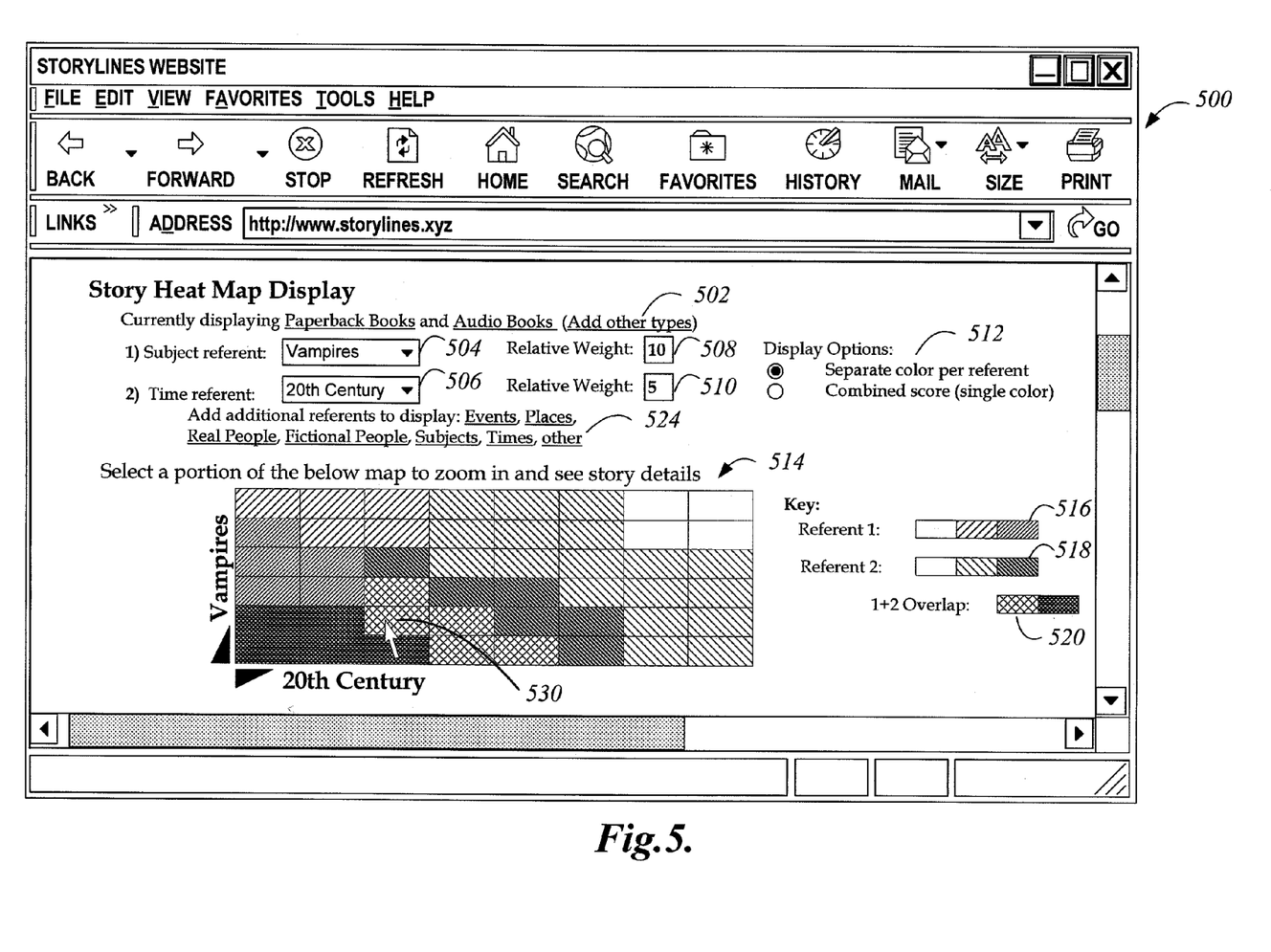
FIG. 5 is an illustrative user interface generated by the story server that displays a graphical story map representation for a set of stories, and that enables a user to assign relative weights to different referents of interest for display in the graphical representation.

FIG. 5 is an illustrative user interface 500 generated by the story server 120 that displays a graphical story map representation 514 for a set of stories (or a "heat map" representation of a set of stories), and that enables a user to assign relative weights to different referents of interest for display in the graphical representation. The graphical story map representation 514 generally includes indicia that each represent a story, where each indicium graphically indicates a strength of association between a given story and the referents of interest to the user. The set of stories represented in a story map, in some embodiments, may correspond to a catalog of stories for which referent information is available in story data store 112. As indicated in version information 502, the graphical story map representation 514 includes stories that are available in either a paperback book version or an audio book version. The user may select "Add other type" text in version information 502 in order to select other formats or version types, which may cause additional indicia to be displayed in representation 514. As illustrated, the user has selected two referents of interest, referents 504 and 506. Referent 504, "Vampires," is of the subject referent type. Referent 506, "20th Century," is of the time referent type. The user may have selected referents 504 and 506, for example, because the user is interested in stories that are associated with both vampires and the twentieth century time period. The user may select other referents of interest to be displayed in representation 514 by selecting additional referent options 524.

The user may optionally select a weight for each referent of interest. As indicated by weight 508, the user has entered a relative weight of "10" for the vampire referent 504. As indicated by weight 510, the user has entered a relative weight of "5" for the 20th Century referent 506. The respective weights may indicate that the user is more interested in the vampire referent 504 than the 20th Century referent 506, because weight 508 ("10") is higher than weight 510 ("5"). The story server 120 may consider the weight assigned to each referent when calculating scores, as discussed below.

The user may select a display option from display options 512. In illustrative user interface 500, the user has selected the option to display a separate color per referent. Accordingly, the vampire referent 504 is represented by a different color (as illustrated by display spectrum 516) than the 20th century referent 506 (illustrated by display spectrum 518). Alternatively, the user may select to display varying intensities of a single color based on a combined score for both referents, in which case a single display spectrum may be used in the story map representation. As illustrated in user interface 500, the display spectrums 516, 518 and 520 are represented by similar patterns as display spectrums 408, 410 and 412 (respectively) in user interface 400 of FIG. 4, discussed above. Accordingly, display spectrum 516 (corresponding to vampire referent 504) may represent varying intensities of blue, display spectrum 518 (corresponding to 20th Century referent 506) may represent varying intensities of red, and display spectrum 520 (corresponding to the overlap of combination of both the vampire and 20th Century referents) may represent varying intensities of purple. Alternatively, as discussed above, a variety of other colors, patterns, and/or other graphical indications may replace any of the three display spectrums.

While the storyline representations discussed above in reference to FIGS. 3 and 4 include indicia corresponding to points in a story, the story map representation 514 in FIG. 5 includes indicia corresponding to stories themselves. Each indicium displayed in representation 514, such as indicium 530, corresponds to a story or a version of a story. The color or pattern of each indicium may be determined based on the strength of association between the story represented by the indicium and the referents of interest to the user. For example, indicium 530, which is light purple, may represent a story that includes one or more associations with the vampire referent 504 and one or more associations with the 20th Century referent 506. In some embodiments, the user may select indicium 530, for example, to view more information regarding the story represented by indicium 530.

In some embodiments, when the user selects to display a separate color per referent (as shown in illustrative user interface 500), the story server 120 may determine a first score for each story based on the number of associations between the story and the first referent of interest (in this example, the vampire referent 504), then determine a second score for each story based on the number of associations between the story and the second referent of interest (in this example, the 20th Century referent 506). If a relative weight is assigned to any referent of interest, the story server may consider the weight when determining the score, such as by multiplying the weight assigned to the referent by the number of associations that the referent has with the given story. As discussed above, in some embodiments, the story data store 112 may include an indication of the relative strength of an individual association between a referent and a story (or a point in the story). The story server may consider the relative strength of each association, in addition to the number of associations, when determining a score. When the user selects to display a combined score or a single color for more than one referent, the story server 120 may determine separate scores for each referent, and then combine the scores to determine a combined score. Alternatively, the story server 120 may determine a single combined score for each story based on the total number of associations between any of the referents of interest and the story, taking into account the relative weights assigned to the referents.

In some embodiments, once the story server 120 has determined a score for each story, the story server may sort the stories based on the scores. For example, as illustrated in representation 514, the story server 120 has placed the stories having the highest combined score (or the greatest strength of association between the story and the referents of interest to the user) in the bottom left of representation 514. More specifically, in the illustrated representation 514, the stories with the highest combined score for both the vampire referent and the 20th Century referent are displayed in the lower left (in dark purple). Generally, the further to the left an indicium representing a story is displayed in representation 514, the greater the story's score for the 20th Century referent (and the greater the intensity of red). Generally, the further down an indicium representing a story is displayed in representation

514, the greater the story's score for the vampire referent (and the greater the intensity of blue). As will be appreciated, the story server 120 may sort stories and corresponding indicia in a variety of ways, including by increasing score, decreasing score, version format or type, alphabetical order by story title or author name, story genre, etc. Furthermore, while the position in representation 514 of an indicium representing a story may be based on a score representing the strength of association between one or more referents and the story, the relative intensity of a color may not coincide directly with an indicium's position in the representation. For example, the change in color intensity of indicia from left to right in a story map representation may not be linear.

While FIG. 5 illustrates one example of a graphical story map representation 514, the story server 120 may generate for display story map representations in a variety of forms. For example, the indicia may be arranged in a circle, such that the story with the highest combined score is represented by an indicium placed in the center of the circle, stories with relatively high scores for a first referent are represented by indicia placed in the left portion of the circle, and stories with relatively high scores for a second referent are represented by indicia placed in the right portion of the circle. In other embodiments, a three-dimensional representation may be presented. For example, if a user selects three referents of interest, a relative position of each indicium in simulated three-dimensional space may be based on the strength of association between the story represented by the indicium and each referent of interest, such that the indicium's position relative to the x-axis is based on the story's score for a first referent of interest, the indicium's position relative to the y-axis is based on the story's score for a second referent of interest, and the indicium's position relative to the z-axis is based on the story's score for a third referent of interest.

In some embodiments, subsets of the indicia may be clustered or "bubbled," such that stories with similar scores are grouped together. For example, clusters of a certain size may be indicated as "bubbles," where the size of each bubble is in proportion to the number of stories in the cluster. Stories that are not members of a cluster may be placed in between the bubbles. Alternatively, cluster membership could be shown by a relative three-dimensional placement of an indicium, such that indicia representing stories that are members of a cluster have the same height or depth in a three dimensional space. In other embodiments, the stories may be sorted and displayed as graphical representations of books on shelves in a virtual library, where wings or aisles may graphically represent clusters of stories with similar scores.

Figure 6:
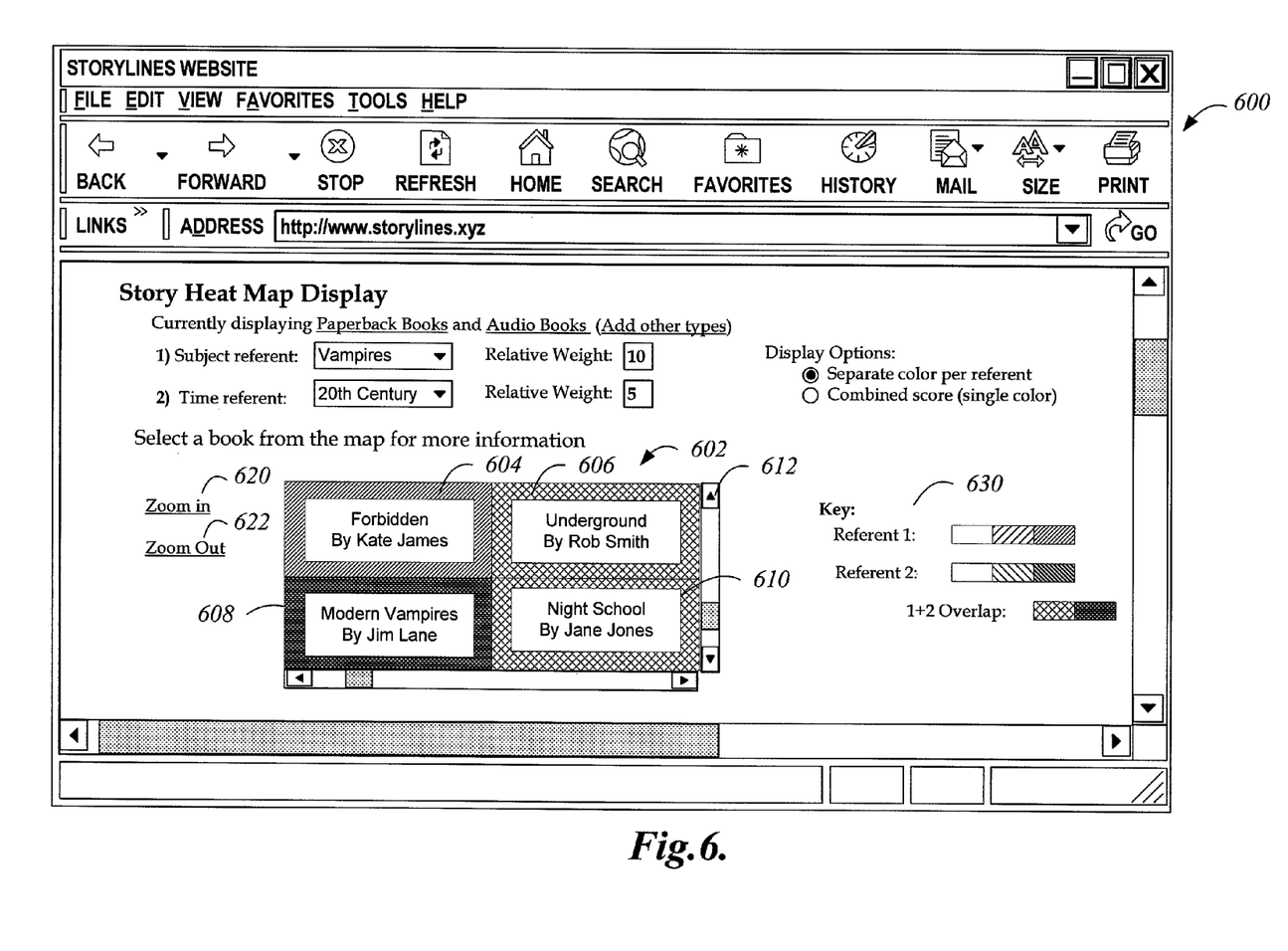
FIG. 6 is an illustrative user interface generated by the story server that displays a graphical representation for a set of stories, where an indicium for each story graphically indicates the strength of association between the story and referents of interest.

FIG. 6 is an illustrative user interface 600 generated by the story server 120 that displays a graphical representation 602 for a set of stories, where an indicium for each story graphically indicates the strength of association between the story and referents of interest. User interface 600 may be presented to a user, for example, after the user selects indicium 530 in user interface 500. As illustrated, representation 602 provides a more detailed or "zoomed-in" representation 602 of the portion of representation 514 surrounding indicium 530. As illustrated in user interface 600, each of indicia 604, 606, 608 and 610 includes information identifying the story corresponding to the given indicium. For example, indicium 610 (which may correspond to the same story as indicium 530 in user interface 500) corresponds to a story titled "Night School," by author Jane Jones. In some embodiments, additional or alternative identifying information or other data may be displayed for each story, such as an image of a book cover, a photograph from a movie, a relevant excerpt or portion of a version of the story, etc. As illustrated, each of indicia 604, 606, 608 and 610 includes a border that is of a color selected from one of the color spectrums illustrated in key 630. The color of each indicium may be determined by the story server 120 in a similar manner as discussed above in reference to the indicia illustrated in FIG. 5. The user may select scroll options 612 in order to display additional indicia in a given direction of representation 602.

The user may select zoom out option 622 or zoom in option 620 of user interface 600 in order to display a story map representation that includes either more or less indicia, respectively, than are currently displayed in representation 602. In some embodiments, a user may select to zoom in to a level at which the story server 120 may present for display a story map representation that includes indicia corresponding to individual points in one or more stories, similar to the storyline representations discussed above in reference to FIGS. 3 and 4.

Figure 7:
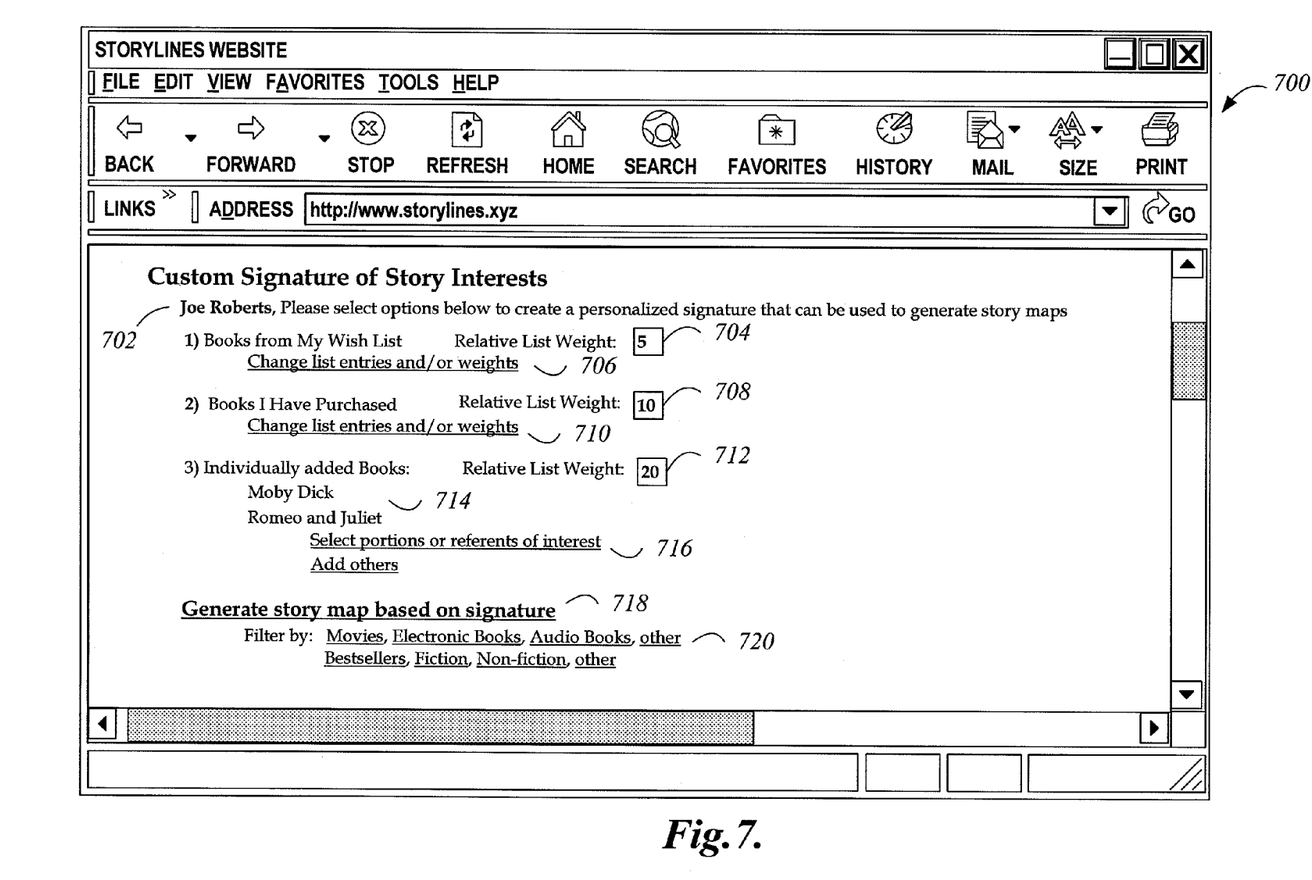
FIG. 7 is an illustrative user interface generated by the story server that enables a user to create a custom signature by selecting stories of interest to the user, where the custom signature may be used by the story server to generate a graphical representation of one or more stories.

FIG. 7 is an illustrative user interface 700 generated by the story server 120 that enables a user to create a custom signature by selecting stories of interest to the user, where the custom signature may be used by the story server 120 to generate a graphical representation of one or more stories. For example, a custom signature may be a convenient mechanism by which a user may select a large number of referents of interest to the user, with optional weights associated with each referent. Alternatively, a custom signature for a user may be determined by the story server 120 without the user explicitly selecting each referent of interest to the user. As indicated by text 702, user interface 700 is presented for a user, "Joe Roberts," to create a personalized or custom signature. The custom signature includes books from the user's wish list, which may be a list of one or more book versions of stories that the user has indicated an interest in purchasing. The user has selected a relative list weight of "5", indicated by weight 704, for the stories included in the wish list. The user may select option 706 in order to change the stories on the wish list, and/or any individual weights associated with each story on the list. The custom signature also includes books that the user has purchased, which may be a list of one or more book versions of stories that the story server 120 has determined that the user has purchased. The purchase history list may be determined based on, for example, purchase history information associated with the user and stored in one or more data stores. The user has selected a relative list weight of "10", indicated by weight 708, for the stories included in the purchase history list. The user may select option 710 in order to change the stories on the purchase history list for purposes of the user's custom signature, and/or to change any individual weights associated with each story on the list.

As illustrated in user interface 700, the custom signature also includes two individually added books, "Moby Dick" and "Romeo and Juliet," which the user may have selected specifically for the purpose of including those books in the user's custom signature. The user has selected a relative weight of "20," indicated by weight 712, for the list of individually added books. The user may select option 716 in order to select portions or specific referents of interest from within the individually added books, as discussed below in reference to FIG. 8.

The user may select story map generation option 718 in order to request that the story server 120 generate a story map representation based on the user's custom signature. The user may optionally filter the stories or versions of stories represented in the generated story map representation by selecting filter options 720. The story map representation may be generated in a similar manner as previously discussed above (such as in reference to FIGS. 5 and 6), but the referents of interest for purposes of determining scores and selecting indicia may be determined by the story server 120 based on the stories included in the user's custom signature. For example, the story server 120 may determine a set of referents with a relatively high number of associations in the stories of interest to the user, taking into consideration the relative weights assigned to each story or list of stories. The story server may then determine scores and indicia for a story map representation of a catalog of stories based on the determined set of referents. For example, if a user's custom signature includes a number of stories that are strongly associated with the "Vampires" subject referent, the story server may determine that the vampires referent is a referent of interest to the user without the user explicitly selecting the vampires referent.

Figure 8:
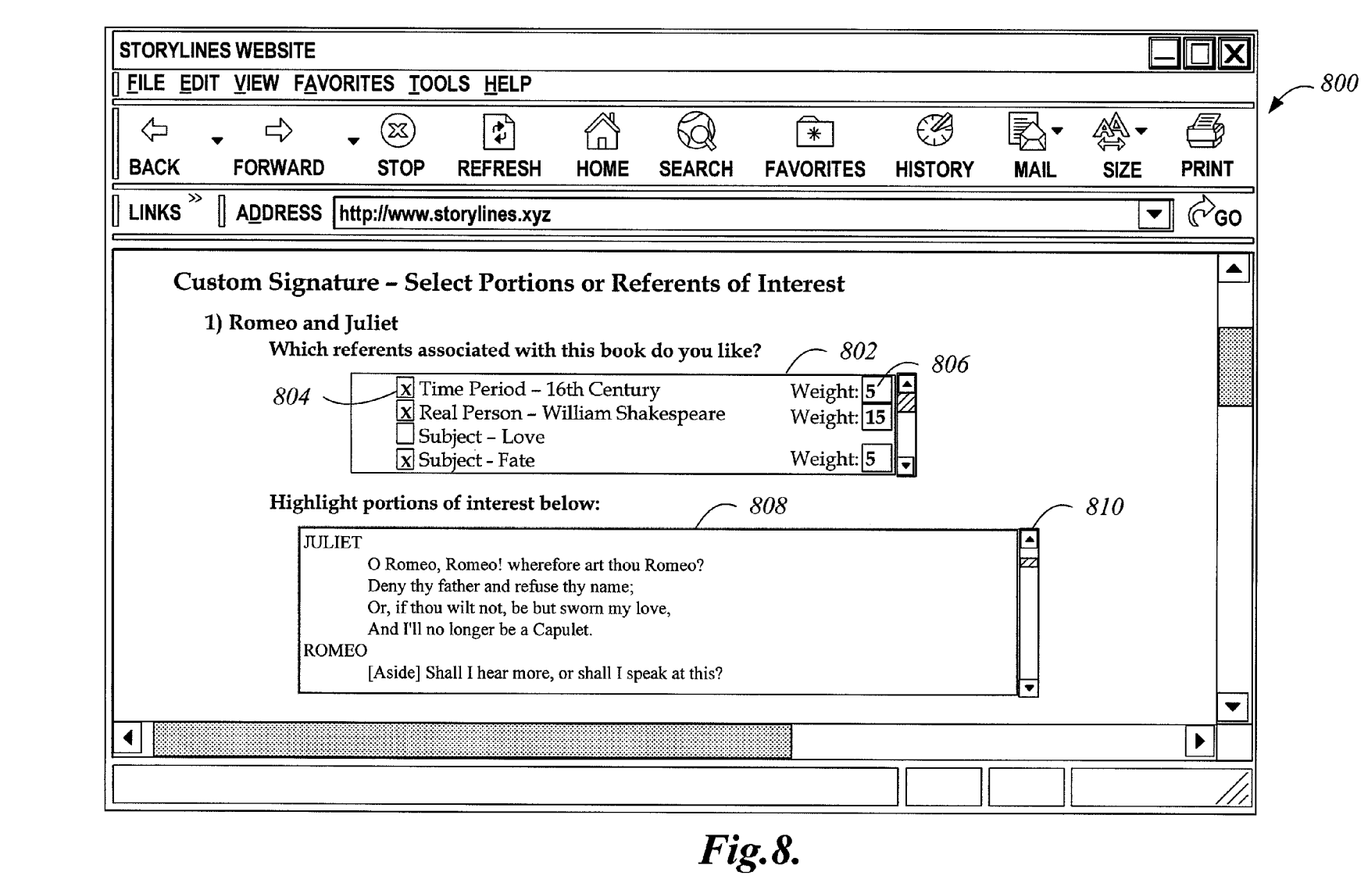
FIG. 8 is an illustrative user interface generated by the story server that enables a user to create a custom signature by selecting referents of interest to the user, and/or by selecting portions of a story of interest to the user.

FIG. 8 is an illustrative user interface 800 generated by the story server 120 that enables a user to create a custom signature by selecting referents of interest to the user, and/or by selecting portions of a story of interest to the user. User interface 800 may be presented to a user, for example, as a result of the user selecting option 716 of user interface 700, illustrated in FIG. 7. The user may have selected option 716 in order to select portions or specific referents of interest from within the individually added book "Romeo and Juliet." Referent list 802 illustrated in user interface 800 is a list of referents associated with the "Romeo and Juliet" story. The user may select the referents of interest to the user, and may assign a weight to each referent. For example, the "16th Century" time period referent has a selection 804 indicating that it will be considered by the story server 120 as a referent of interest for purposes of the user's custom signature. The 16th Century referent is assigned a weight of "5," as indicated by weight 806. In some embodiments, the story server 120 may default to weighting all referents in a story of interest equally for purposes of the user's custom signature, unless or until the user indicates that a given referent is not of interest, or the user changes the weight assigned to a referent.

Illustrative user interface 800 also includes selectable text portion 808, which includes content from a version of the "Romeo and Juliet" story, such as an electronic book version. The user may scroll through the text by selecting scroll options 810. The user may select or highlight a portion of the content displayed in text portion 808 in order to indicate that the user is interested in or likes the given portion of the story. In some embodiments, the story server 120 may then determine one or more referents associated with the selected portion based on referent association data stored in story data store 112. The story server may then consider the determined referents as referents of interest to the user for purposes of the user's custom signature. Once the user selects a portion, the user may be prompted to optionally assign a weight to the selected portion (not illustrated). In other embodiments, the user may be able to select portions of a story in ways other than via display of story content. For example, the user may select a chapter, scene, or other predefined portion of content as a portion of interest to the user.

As discussed throughout the present disclosure, the above methods may enable users to explore stories based on referents of interest to the user. In some embodiments, for example, a user may read a book that the user enjoyed because of a certain character, a certain time period, and/or some other referent discussed in the narrative of the story. Aspects of the present disclosure may then enable the user to view a graphical representation of a set of stories, where the graphical representation enables the user to explore other stories associated with referents of interest to the user.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for graphically representing one or more referents associated with a plurality of stories, the system comprising:
   a data store that stores data associated with a plurality of stories, wherein the data associated with each story comprises referent data identifying one or more referents associated with the story; and
   a computing device in communication with the data store and that executes:
      a first processing component operative to:
         receive a user selection of a first referent of interest to the user and a second referent of interest to the user, wherein the first referent and second referent each comprise at least one of an event, a character, an object, a subject, a time, a place and a person;
         determine, for each of the plurality of stories, a first score for the story, wherein the first score is determined based at least in part on a number of times that the first referent of interest to the user is referenced in at least a portion of content of the story; and determine, for each of the plurality of stories, a second score for the story, wherein the second score is determined based at least in part on a number of times that the second referent of interest to the user is referenced in at least a portion of content of the story;

wherein the first score and the second score for each of the plurality of stories are determined based at least in part on referent data stored in the data store; and a second processing component operative to generate for display a graphical representation of a subset of the plurality of stories, the graphical representation comprising:

a plurality of indicia, wherein each story of the subset of the plurality of stories is represented by one indicium of the plurality of indicia, wherein each indicium of the plurality of indicia is associated with a different story of the subset of the plurality of stories, wherein the indicium associated with each story graphically indicates a strength of association between the story and both the first referent of interest to the user and the second referent of interest to the user, wherein the strength of association is determined based at least in part on the first score and the second score.

2. The system of claim 1, wherein a first color represents the first referent of interest to the user and a second color represents the second referent of interest to the user, and wherein, for each of the plurality of indicia, the strength of association between the story and the first and second referents of interest is graphically indicated by a combination of the first color and the second color.

3. The system of claim 2, wherein a relative intensity of the first color in the combination corresponds to the first score, wherein a relative intensity of the second color in the combination corresponds to the second score.

4. A system for graphically representing one or more referents associated with a plurality of stories, the system comprising:

a data store that stores data associated with a plurality of stories, wherein the data associated with each story comprises referent data identifying one or more referents associated with the story; and a computing device in communication with the data store, the computing device operative to:

determine, for each of the plurality of stories, a score for the story based at least in part on a number of times that the one or more referents of interest are referenced in at least a portion of content of the story, wherein the number of times that the one or more referents of interest are referenced is derived at least in part from the referent data stored in the data store; and generate for display a graphical representation of a subset of the plurality of stories, the graphical representation comprising a plurality of indicia, wherein each indicium of the plurality of indicia is associated with a different story of the subset of the plurality of stories, wherein the indicium for each story of the subset graphically indicates a strength of association between the story and the one or more referents of interest, and wherein the strength of association is determined based at least in part on the score for the story.

5. The system of claim 4, wherein each indicium comprises a color.

6. The system of claim 5, wherein the strength of association between the story and the one or more referents of interest is indicated by a relative intensity of the color.

7. The system of claim 4, wherein the strength of association between the story and the one or more referents of interest is indicated by a combination of colors, wherein the combination of colors comprises a color associated with each referent of interest that is associated with the story.

8. The system of claim 4, wherein the one or more referents of interest are selected by a user.

9. The system of claim 4, wherein the one or more referents of interest are determined based at least in part on one or more stories selected by a user.

10. The system of claim 4, wherein the one or more referents of interest are determined based at least in part on a portion of content selected by a user.

11. The system of claim 4, wherein the score for each of the plurality of stories is determined based at least in part on a weight associated with at least one of the one or more referents of interest.

12. The system of claim 4, wherein each referent of interest comprises at least one of an event, a character, an object, a subject, a time, a place and a person.

13. The system of claim 4, wherein two or more indicia of the plurality of indicia are represented as clusters in the graphical representation, wherein the two or more indicia are represented as clusters based at least in part on a comparison of the score for the story corresponding to each of the two or more indicia.

14. A computer-implemented method for graphically representing one or more referents associated with a plurality of stories, the computer-implemented method comprising:

as implemented by one or more computing devices configured with specific executable instructions, determining, for each of the plurality of stories, a score for the story based at least in part on a number of times that one or more referents of interest are referenced in at least a portion of content of the story; and generating for display a graphical representation of a subset of the plurality of stories, the graphical representation comprising a plurality of indicia, wherein each indicium of the plurality of indicia is associated with a different story of the subset of the plurality of stories, wherein the indicium for each story of the subset graphically indicates a strength of association between the story and the one or more referents of interest, and wherein the strength of association is determined based at least in part on the score for the story.

15. The computer-implemented method of claim 14, wherein each indicium comprises a color.

16. The computer-implemented method of claim 15, wherein the strength of association between the story and the one or more referents of interest is indicated by a relative intensity of the color.

17. The computer-implemented method of claim 14, wherein the strength of association between the story and the one or more referents of interest is indicated by a combination of colors, wherein the combination of colors comprises a color associated with each referent of interest that is associated with the story.

18. The computer-implemented method of claim 14, wherein each referent of interest comprises at least one of an event, a character, an object, a subject, a time, a place and a person.

19. The computer-implemented method of claim 14, wherein the score for each of the plurality of stories is determined based at least in part on a weight associated with at least one of the one or more referents of interest.

20. The computer-implemented method of claim 14, wherein the subset of the plurality of stories in the graphical representation is determined based at least in part on a zoom level selected by a user.

21. A non-transitory, computer-readable medium having a computer-executable component, the computer-executable component comprising:
a user interface component which causes display of a graphical representation of associations between referents of interest and a plurality of stories, the graphical representation comprising a plurality of indicia, wherein each indicium of the plurality of indicia is associated with a different story of the plurality of stories, wherein the indicium for each story of the plurality of stories graphically indicates a strength of association between the story and one or more referents of interest, wherein the strength of association is determined based at least in part on a number of times that the story is associated with the one or more referents of interest.

22. The non-transitory, computer-readable medium of claim 21, wherein a position of each indicium within the graphical representation is determined based at least in part on the strength of association between the story and the one or more referents of interest.

23. The non-transitory, computer-readable medium of claim 21, wherein the strength of association is graphically indicated by a relative intensity of color.

24. The non-transitory, computer-readable medium of claim 21, wherein the strength of association is determined based at least in part on a weight associated with each referent of interest.

25. The non-transitory, computer-readable medium of claim 21, wherein the strength of association between the story and the one or more referents of interest is indicated by a combination of colors, wherein the combination of colors comprises a color associated with each referent of interest that is associated with the story.

26. The non-transitory, computer-readable medium of claim 21, wherein the one or more referents of interest are selected by a user.

27. The non-transitory, computer-readable medium of claim 21, wherein the graphical representation comprises three dimensions.

28. The non-transitory, computer-readable medium of claim 27, wherein a position of an indicium in each of the three dimensions corresponds to the strength of association between the story and one of the one or more referents of interest.

29. The non-transitory, computer-readable medium of claim 21, wherein the one or more referents of interest are determined based at least in part on one or more stories selected by a user.

* * * * *